US009021450B2

(12) United States Patent
Guarnieri et al.

(10) Patent No.: US 9,021,450 B2
(45) Date of Patent: Apr. 28, 2015

(54) SCALABLE AND PRECISE STRING ANALYSIS USING INDEX-SENSITIVE STATIC STRING ABSTRACTIONS

(71) Applicant: International Business Machines Corporation, Armonk, NY (US)

(72) Inventors: Salvatore Angelo Guarnieri, New York, NY (US); Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 13/792,623

(22) Filed: Mar. 11, 2013

(65) Prior Publication Data

US 2014/0258992 A1  Sep. 11, 2014

(51) Int. Cl.
*G06F 9/44* (2006.01)
*G06F 9/45* (2006.01)
*G06F 11/36* (2006.01)
*G06F 21/57* (2013.01)
*G06F 21/56* (2013.01)

(52) U.S. Cl.
CPC .......... *G06F 11/3608* (2013.01); *G06F 21/577* (2013.01); *G06F 21/564* (2013.01)

(58) Field of Classification Search
CPC ...... G06F 11/3604; G06F 21/563; G06F 8/75
See application file for complete search history.

(56) References Cited

U.S. PATENT DOCUMENTS

| 8,156,483 | B2 * | 4/2012 | Berg et al. ..................... 717/152 |
| 8,429,633 | B2 * | 4/2013 | Title et al. ..................... 717/152 |
| 8,533,694 | B2 * | 9/2013 | Pistoia et al. ................. 717/143 |
| 2009/0171955 | A1 | 7/2009 | Merz et al. |
| 2010/0333201 | A1 | 12/2010 | Haviv et al. |
| 2011/0016457 | A1 * | 1/2011 | Artzi et al. ..................... 717/131 |
| 2011/0145785 | A1 * | 6/2011 | Centonze et al. ............. 717/131 |
| 2012/0096440 | A1 * | 4/2012 | Tateishi et al. ............... 717/141 |
| 2012/0185943 | A1 * | 7/2012 | Tripp ............................. 726/25 |
| 2013/0139266 | A1 * | 5/2013 | Amit et al. ..................... 726/25 |
| 2014/0096257 | A1 * | 4/2014 | Chou et al. ..................... 726/25 |

(Continued)

OTHER PUBLICATIONS

Yichen Xie et al.; Static detection of security vulnerabilities in scripting languages; 2006 USENIX; pp. 179-192; <https://www.usenix.org/legacy/event/sec06/tech/full_papers/xie/xie_html/>.*

(Continued)

*Primary Examiner* — Thuy Dao
*Assistant Examiner* — Cuong V Luu
(74) *Attorney, Agent, or Firm* — Harrington & Smith

(57) ABSTRACT

A disclosed method includes accessing one or more seeding specifications and a program including computer-readable code and applying the one or more seeding specifications to the program to identify for analysis seeds including strings for corresponding identified string variables. The method includes tracking flows emanating from the identified seeds. The tracking includes computing an integral offset into a tracked string variable for any statements causing such a computation. The tracking also includes providing a string representation based on the computed integral offset, wherein the provided string representation comprises a value of the integral offset and an indication of the corresponding tracked string variable. The tracking further includes modeling string manipulations of the tracked string variables using the string representations. Apparatus and program products are also disclosed.

6 Claims, 5 Drawing Sheets

(56) References Cited

U.S. PATENT DOCUMENTS

2014/0189658 A1* 7/2014 Guarnieri et al. ............. 717/131
2014/0258992 A1* 9/2014 Guarnieri et al. ............. 717/131

OTHER PUBLICATIONS

Xinran Wang et al.; Still Exploit Code Detection via Static Taint and Initialization Analyses; 2008 IEEE; pp. 289-298; <http://ieeexplore.ieee.org/stamp/stamp.jsp?tp=&arnumber=4721566>.*

Richard E. Hank et al.; Superblock Formation Using Static Program Analysis; 1993 IEEE; pp. 247-255; <http://ieeexplore.ieee.org/stamp/stamp.jsp?tp=&arnumber=282738>.*

Laurie Hendren et al.; Enabling Static Analysis for Partial Java Programs; 2008 ACM; pp. 313-328; <http://dl.acm.org/citation.cfm?id=1449790>.*

Dominic Widdows ; Unsupervised methods for developing taxonomies by combining syntactic and statistical information ; 2003 ACM; pp. 197-204; <http://dl.acm.org/citation.cfm?id=1073445.1073481>.*

Feifei Li et al.; Spatial Approximate String Search; 2013 IEEE; pp. 1394-1409; <http://ieeexplore.ieee.org/stamp/stamp.jsp?tp=&arnumber=6165287>.*

Se-Won, K. et al.; "String analysis as an abstract interpretation": Verification, Model Checking, and Abstract Interpretation. Proceedings of the 12th International Conference, VMCAI 2011, pp. 294-308; 2011.

Fang, Y. et al.; "Symbolic string verification: combining string analysis and size analysis"; Tools and Algorithms for the Construct on & Analysis of Systems. Proceedings 15th International Conference; TACAS 2009. 2009.

Fang, Y. et al.; "Symbolic string verification: an automata-based approach": Model Checking Software. 15th International SPIN Workshop; pp. 306-324.; 2008.

Leavenworth, B. et al.; "The Use of Data Abstraction in Program Design"; http://www.ip.com/pubview/IPCOM000148817D; Mar. 30, 2007.

Minamide, Y.; "Static Approximation of Dynamically Generated Web Pages"; International World Wide Web Conference Committee (IW3C2), 2005, pp. 432-441.

Tripp, Omer, et al: "Hybrid Analysis for JavaScript Security Assessment", ACM, 2010, 4 pgs.

Kiezun, Adam, et al.; "HAMPI: A Solver for String Constraints", ISSTA 2009, 11 pgs.

Tateishi, Takaaki, et al., "Path- and Index-sensitive String Analysis Based on Monadic second-order Logic", ISSTA, 2011, pp. 166-176.

* cited by examiner

```
var strUrl = document.location.href;
var bc = 0;
var n = strUrl.indexOf( "bc-" );
if (n != -1)
{
    document.location.href = strUrl.substring(0, n);
    bc = strUrl.substring(n+3);
}
```

FIG. 1

SCALABLE AND PRECISE STRING ANALYSIS USING INDEX-SENSITIVE STATIC STRING ABSTRACTIONS

BACKGROUND

This invention relates generally to analysis of program code and, more specifically, relates to analysis of the use of strings in program code.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Acronyms that appear in the text or drawings are defined below, prior to the claims.

Static analysis is an analysis that involves examining the code of programs such as Web programs without executing the code of the program. Some type of model is (or models are) created of the code of the program, to estimate what would happen when the code actually is executed. String analysis is a form of static analysis, where the properties the string analysis tracks relate to strings and their dynamic values. This type of analysis has several important applications, including accessibility (e.g., in websites), typestate analysis (where file names and other resource identifiers are tracked precisely) and security.

There is a vast body of work on string analysis. The paper by Tateishi, Pistoia, and Tripp, entitled "Path- and Index-sensitive String Analysis Based on Monadic Second-order Logic" (ISSTA '11, Jul. 17-21, 2011, Toronto, ON, Canada) provides a rich discussion of recent works in this space, with special emphasis on index-sensitive string analyses. A key feature of such analyses is that they model both string values and integral values, such that string operations like "substring" can be modeled accurately.

A problem with this approach is that the scalability of the analysis is limited: Instead of tracking only specific string values, the analysis now needs to further account for integral variables in the program and model transformations on integral values in a sound and precise manner. More scalable approaches, such as modeling strings as regular expressions or context-free grammars, are significantly more scalable, but do not provide adequate support for index-based string manipulations.

BRIEF SUMMARY

The following summary is merely intended to be exemplary. The summary is not intended to limit the scope of the claims.

A method includes accessing one or more seeding specifications and a program comprising computer-readable code and applying the one or more seeding specifications to the program to identify for analysis seeds comprising strings for corresponding identified string variables. The method includes tracking flows emanating from the identified seeds. The tracking includes computing an integral offset into a tracked string variable for any statements causing such a computation. The tracking also includes providing a string representation based on the computed integral offset, wherein the provided string representation comprises a value of the integral offset and an indication of the corresponding tracked string variable. The tracking further includes modeling string manipulations of the tracked string variables using the string representations. Apparatus and program products are also disclosed.

BRIEF DESCRIPTION OF THE SEVERAL VIEWS OF THE DRAWINGS

FIG. 1 is a snippet of program code used as a real-world example showing the importance of string analysis;

FIG. 3, including

DETAILED DESCRIPTION

As stated above, there are problems with index-sensitive string analyses. FIG. 1 is a snippet of program code 100 used as a real-world example to show the importance of string analysis. FIG. 1 shows program code 100 written in JavaScript, which is an interpreted computer programming language. JavaScript was originally implemented as part of web browsers so that client-side scripts may, e.g., interact with the user, control the browser, communicate asynchronously and alter the document content that is displayed. In the JavaScript code of FIG. 1, the URL of the page enclosing the script is read into variable strUrl, a prefix of strUrl is computed based on its lower-case version (up to the first occurrence of "bc-" in strUrl), and this prefix is then assigned as the new URL, thereby causing a redirection action by the browser.

Naïve "taint" analysis of this code may find the code vulnerable to an open redirection attack, whereby the attacker has control over the target URL (because the URL contains user-provided parameters). The specific code 100 has led to over 300 false open-redirection reports by a commercial security product. Customers using the product reported these false findings as a severe product defect. However, a sufficiently precise string analysis would conclude that the redirection does not change the path portion of the URL in a way that could be influenced by an attacker. This is true because, while the statement "document.location.href=strUrl.substring (0,n)" performs redirection, the redirection is not influenced by the attacker.

A challenge is to resolve false findings such as these using a scalable form of string analysis: one that can be applied to HTML pages containing thousands of complex script code lines. This is, in practice, the scale commercial tools are expected to handle (in some cases, over 10,000 lines of code).

Figure 2:
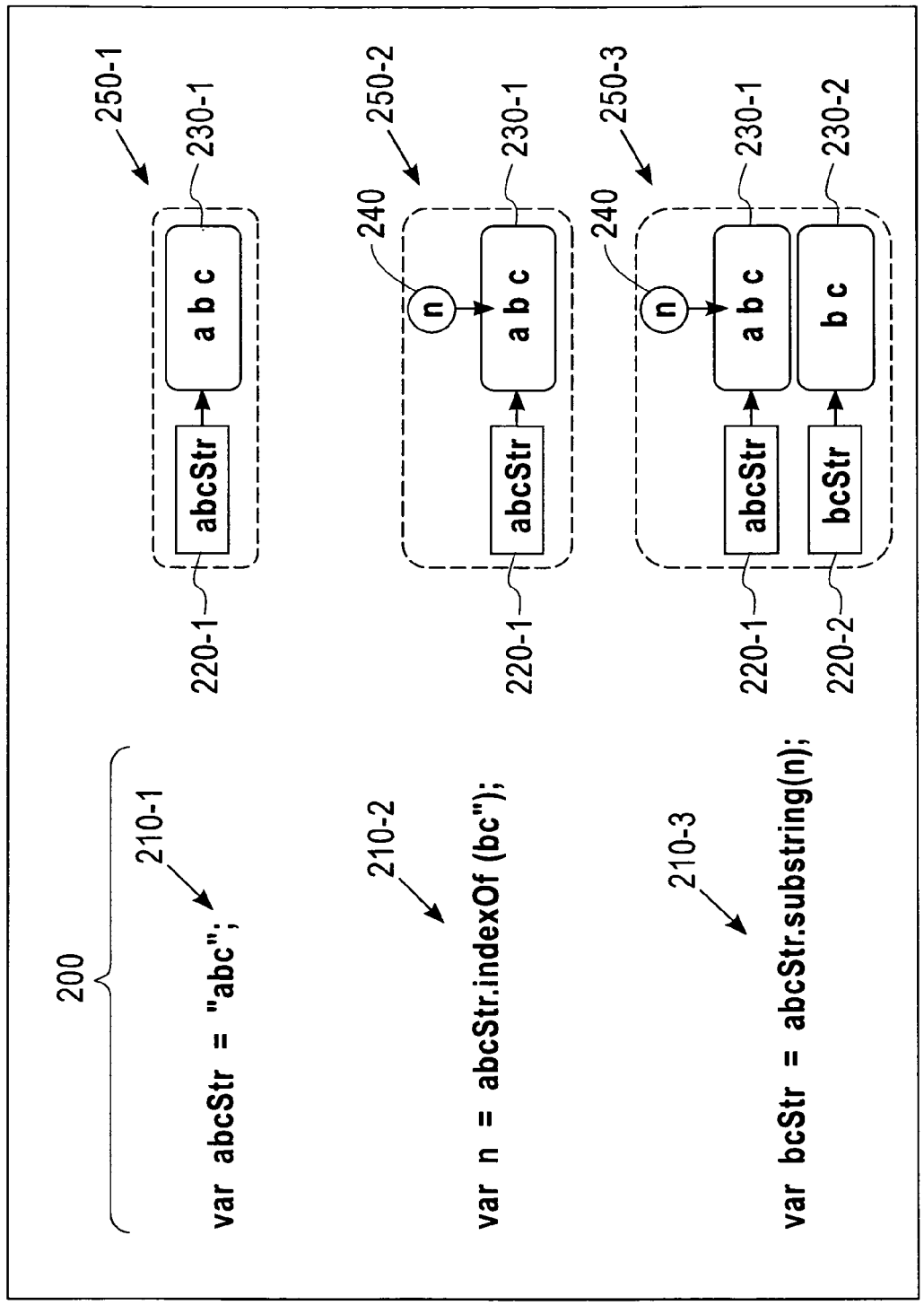
FIG. 2 is an example of program code and a corresponding visual representation of the code.

To provide a scalable form of string analysis, exemplary embodiments herein combine relevant information about integral values into string abstractions, instead of maintaining separate information about strings and integers. FIG. 2 provides a visual example of this. Here, program code 200 comprises three statements 210, and each of the statements 210 has a corresponding visualization 250. In the visualizations 250, there are a number of environment pointers 220, string values 230, and variables of type integer 240. The effect of the statements on the left is represented by the abstract states on the right.

The visualization 250-1 of statement 210-1 indicates that the environment pointer (of "abcStr") 220-1 points to the string "abc" 230-1, while the visualization 250-2 of statement 210-2 adds the integer n 240. The "indexOf" method returns the position of the first occurrence of a specified value in a string. That is, the index of "bc" in the string "abc" is one (1). The visualization 250-3 of statement 210-3 further indicates that the environment pointer (of "bcStr") 220-2 points to the string "bc" 230-2, The substring (from, to) method extracts characters from a string, between two specified indices "from" and "to", and returns the new substring. The "from" index is the index indicating where to start the extraction. The first character is at index 0 (zero). The "to" index is optional and is the index indicating where to stop the extraction, and the extraction does not include "to" itself. If the "to" index is omitted, the substring method extracts the rest of the string starting at "from".

In this exemplary abstraction, the integer n 240 is not represented separate y from string abcStr, as a numeric value (the value 1), but rather forms a built-in part of the representation of the string abcStr. This enables precise modeling of the substring operation resulting in bcStr, while recording only the integral values that matter, and doing so in an "inexpensive" way, as part of a string representation.

The exemplary approaches herein have two important advantages:

1. The analysis becomes more scalable: Since the state abstraction maintained by the analysis is still geared (e.g., only) toward strings, and the analysis tracks integral values on demand (e.g., variable n defined in terms of an indexOf operation as shown in FIG. 2), the overall number of integers tracked by the analysis is very small. This mitigates the problem of state-space explosion resulting from modeling and retaining fine-grained distinctions over too many integer variables, most of which prove irrelevant to the goals of the analysis. For instance, a relatively small number of operations performed using strings will affect corresponding integral values (e.g., as compared to all operations performed by program code). Many conventional string analyses will use all possible values of string expressions and/or all possible lengths of strings at various program points, even for the strings involved in these operations, as well and as other arbitrary integral variables defined and used throughout the program. By tracking integral values for these operations, the number of possible values of string expressions and/or all possible lengths of strings for these operations should be dramatically reduced.

2. The analysis can be expressed on top of efficient interprocedural analysis frameworks, such as the IFDS framework described in Reps et al., "Precise Interprocedural Dataflow Analysis via Graph Reachability", Proceedings of the 22nd ACM SIGPLAN-SIGACT symposium on Principles of programming languages, pages 49-61, 1995: The fact that information about integral offsets into a string (variable n in the example above) is packaged into the core string representation enables precise modeling of index-based string operations within a fine-grained distributive analysis model, where data-flow facts comprise individual strings or small sets of strings, rather than the entire program state.

For encoding the offset information, one example of this encoding is an auxiliary data structure (e.g., a string representation such as a dictionary mapping integer variables to offsets within a string). Other examples are also possible.

Figure 3A:
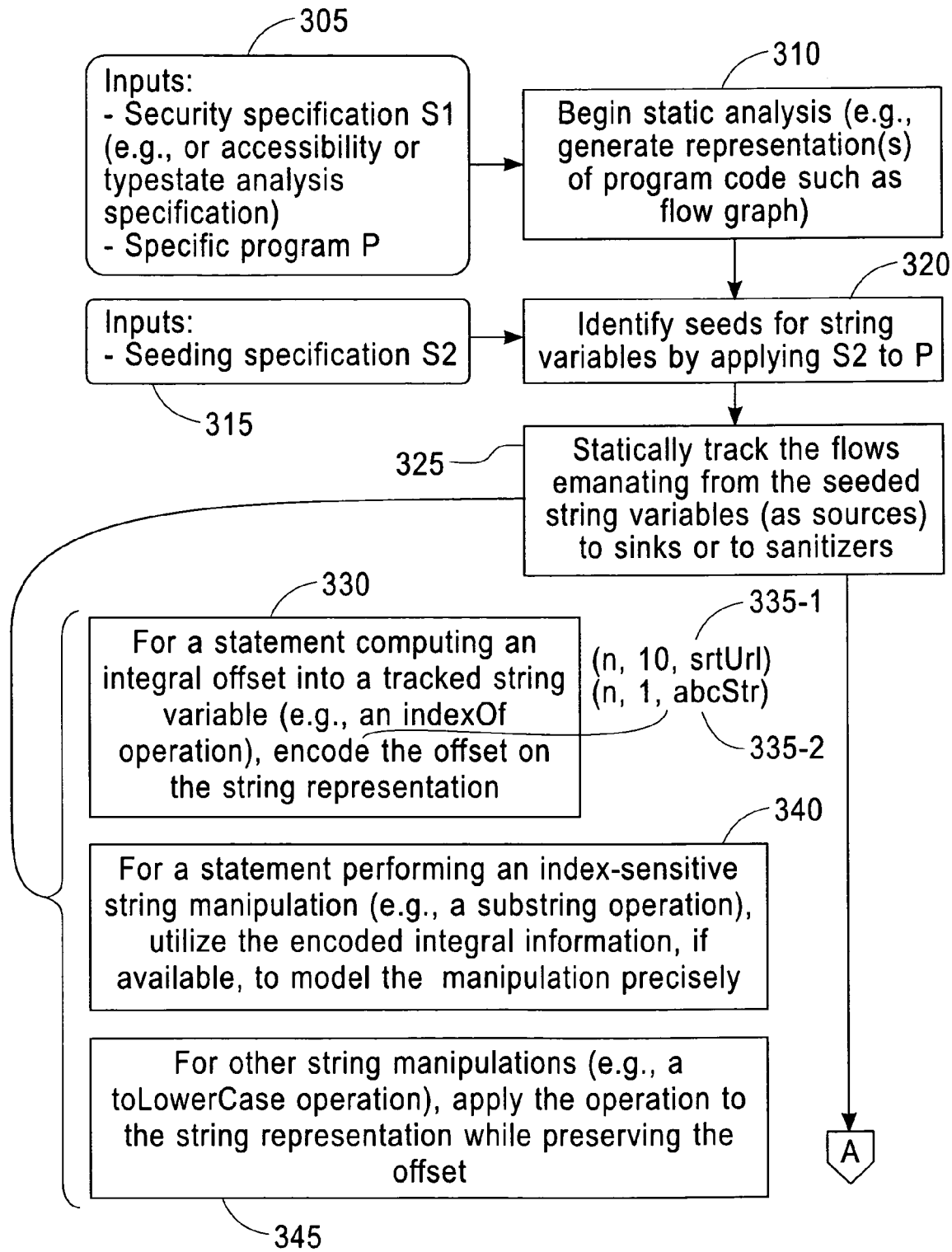
FIGS. 3A and 3B, is a logic flow diagram for performing static analysis including scalable and precise string analysis using index-sensitive static string abstractions, and illustrates the operation of an exemplary method, a result of execution of computer program instructions embodied on a computer readable memory, and/or functions performed by logic implemented in hardware, in accordance with an exemplary embodiment.
Figure 3B:
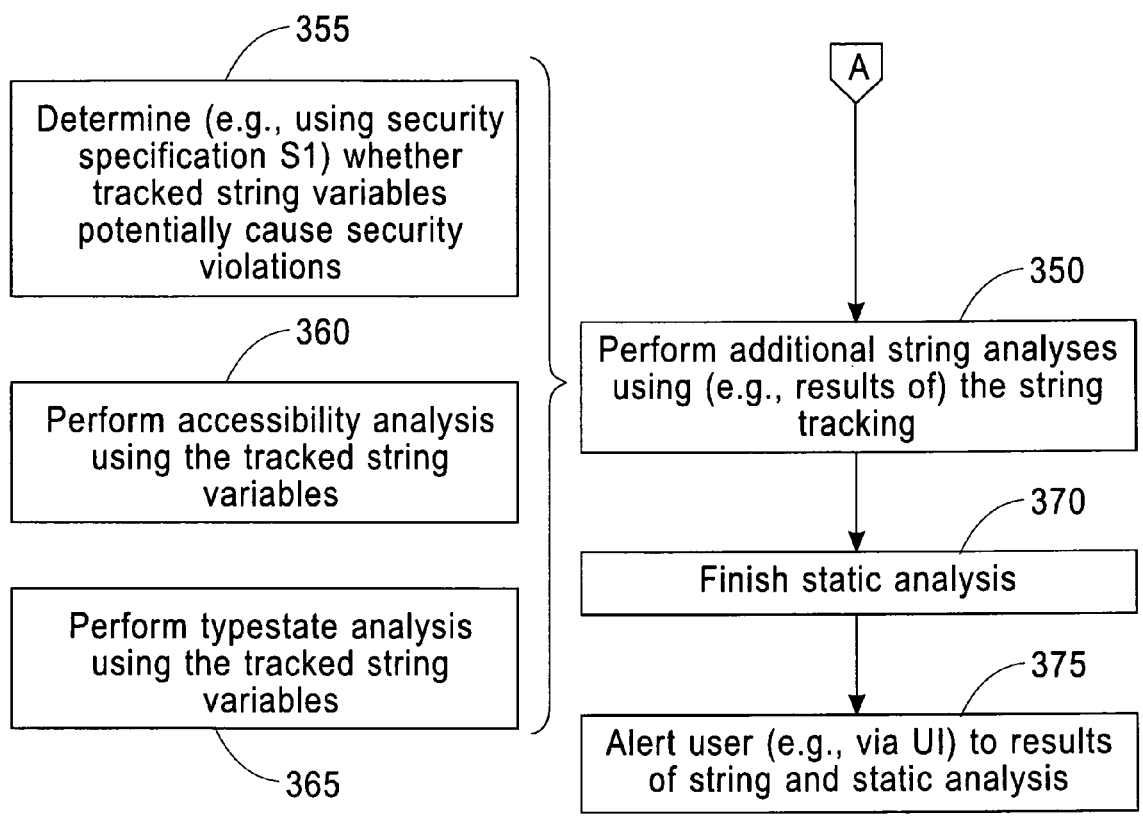

Referring to FIG. 3, including FIGS. 3A and 3B, a logic flow diagram is shown for performing static analysis including scalable and precise string analysis using index-sensitive static string abstractions. FIG. 3 illustrates the operation of an exemplary method, a result of execution of computer program instructions embodied on a computer readable memory, and/or functions performed by logic implemented in hardware, in accordance with an exemplary embodiment. In an example, for instance, the operations in FIG. 3 may be performed by a computing system (see, e.g., FIG. 4), in response to execution by one or more processors of computer-readable code. For the description of FIG. 3, it is assumed a computing system performs the operations described.

In block 310, the computing system begins a static analysis of a program. Inputs 305 to the static analysis may include a security specification S1 and a subject program P. The security specification is a standard one, typically indicating sources, sinks and sanitizers. FIG. 3 places primary emphasis on security analysis for security vulnerabilities such as cross-site scripting (XSS) attacks, which occur when a Web application accepts data originating from a user and sends the data to another user's browser without first validating or encoding the data, and injection flaws, the most common of which is Structured Query Language injection (SQLi), which arise when a Web application accepts input from a user and sends the input to an interpreter as part of a command or query, without first validating the input. Other security vulnerabilities are also possible. However, the instant exemplary embodiments are also applicable to accessibility (e.g., in websites), and typestate analysis (where file names and other resource identifiers are tracked precisely). As such, the inputs 305 may include an accessibility specification or typestate analysis specification, to be applied to the program P.

With regard to security analysis, the static analysis in block 310 may include generating one or more representations (such as models) of the program P, in order to represent how the program may operate during execution (the program P is not, however, actually executed during static analysis). One typical representation is a flow graph, which is a representation, using graph notation, of all paths that might be traversed through a program during its execution. Other representations may also include representations of the heap, and others known to those skilled in this area.

In block 320, the computing system identifies seeds for string variables by applying S2 to P. In an exemplary security analysis, the seeds are strings defined for (e.g., particular, identified) string variables by the seeding specification S2 as an input 315. The notion of seeding is standard in static analysis. One can think of seeding as the designated entry state from which analysis starts. Similar seeding would also be performed for the accessibility and typestate analyses. In block 325, the computing system statically tracks the flows emanating from the seeded string variables (as sources) to sinks or to sanitizers. A "source" is a starting point for taint in the program, where taint is (in this case, string) input from outside the program that may cause a security violation. The taint is assumed to flow to a sanitizer or a sink. A sanitizer is a method that manipulates its input to produce taint-free output, typically for a particular security vulnerability. Tainted flows are typically invalidated at sanitizers, and terminated at sinks, although these actions may be up to the implementation of the analysis.

Blocks 330, 340, and 345 are examples of operations performed as strings are tracked during the static analysis. In block 330, the computing system, for a statement computing an integral offset into a tracked string (e.g., an indexOf operation), encodes the offset on the string representation. This example shows string representations for tracked variables. The string representations in this case are two dictionaries 335. Dictionary 335-1 corresponds to the program code 100 in FIG. 1 and particularly to the statement "var n=strUrl.indexOf("bc-")". In this example, the dictionary 335-1 contains a pointer to the integral variable n (shown as "n"), the index 10, and a pointer to the string (shown as "strUrl"). The index 10 is merely exemplary and would be whatever the appropriate index is for the integral variable n. It is noted that in some cases, the analysis knows the exact index because the analysis computes the effect of an indexOf call. In other cases, the value is only approximate. Dictionary 335-2 corresponds to FIG. 2 and particularly to the statement "var n=abcStr.indexOf("bc")". The dictionary 335-2 contains a pointer to the variable n (shown as "n"), the index 1 (one), and a pointer to the string (shown as "abcStr"). It should be noted that the dictionary 335-2 is a string representation of the environment pointer 220-1, the integral variable 240, and a value for the integral variable 240.

In block 340, the computing system, for a statement performing an index-sensitive string manipulation (e.g., a substring operation), utilizes the encoded integral information, if available, to model the manipulation precisely. Precise modeling means that no information is lost due to the fact that this operation is applied to an abstract, rather than concrete, string, value. In the example of FIG. 1, the manipulations in the statement of "document.location.href=strUrl.substring(0, n)" and the statement of "bc=strUrl.substring(n+3)" can be modeled precisely by block 340. It is noted that if there is no a concrete value for strUrl (or at least a portion of this string), then basically almost all information is lost through abstract modeling of the substring operation. In the example of FIG. 2, the manipulations in the statement of "document.location.href=strUrl.substring(0,n)" and the statement of "bc=strUrl.substring(n+3)" can be modeled precisely by block 340.

In block 345, the computing system, for other string manipulations e.g., a toLowerCase operation), applies the operation to the string representation while preserving the offset. In the example of dictionaries 334-1 and 335-2, the offsets include the numbers 10 and 1, respectively. These offsets are preserved because their values are not changed and no manipulation occurs (in these examples) to the variables n.

In block 350, the computing system performs additional string analyses using (e.g., results of) the string tracking. For instance, one example of an additional string analysis is for the computing system to determine (e.g., using security specification S1) whether tracked string variables potentially cause security violations in block 355. For FIG. 1, block 355 may involve a sufficiently precise string analysis that would conclude that the redirection (in the statement "document.location.href=strUrl.substring (0,n)") does not change the path portion of the URL in a way that could be influenced by an attacker. Block 355 may also be applied to the bcStr string in FIG. 2, and to operations the program code 200 performs using the bcStr.

As stated above, FIG. 3 places primary emphasis on security analysis, but the operations in the figure are also applicable to accessibility (e.g., in websites) as indicated by the performance of an accessibility analysis using the tracked string variables in block 360, and the performance of typestate analysis (where file names and other resource identifiers are tracked precisely) using the tracked string variables in block 365.

It should be noted that because one is using string representations during the static tracking (block 325) and modeling of string manipulations (e.g., blocks 340 and 345), the string analyses performed in block 350 should be improved as described above. Furthermore, the string analyses performed in block 355 may be performed at the same time as the static tracking in block 325. For example, as the static tracking in block 325 progresses, and blocks 330, 340, and 345 are performed, part or all of the string analysis of block 350 may be performed.

In block 370, the computing system finishes static analysis. In block 375, the computing system may alert a user (e.g., via a user interface, UI) to results of the string and static analysis. In the example of FIG. 1, where a sufficiently precise string analysis would conclude that the redirection does not change the path portion of the URL in a way that could be influenced by an attacker, and therefore the program code 100 is not vulnerable to an open redirection attack, there may be no indication to the user that the program code 100 (specifically, the statement "document.location.href=strUrl.substring (0,n)") is not vulnerable to an open redirection attack. However, as another example, a "warning" could be generated and presented to a user in block 375, such as the following: "Warning: the statement 'document.location.href=strUrl.substring (0.n)' has been analyzed and is believed to not be vulnerable to an open redirection attack". This would allow the user the ability to double check the analysis if desired.

Figure 4:
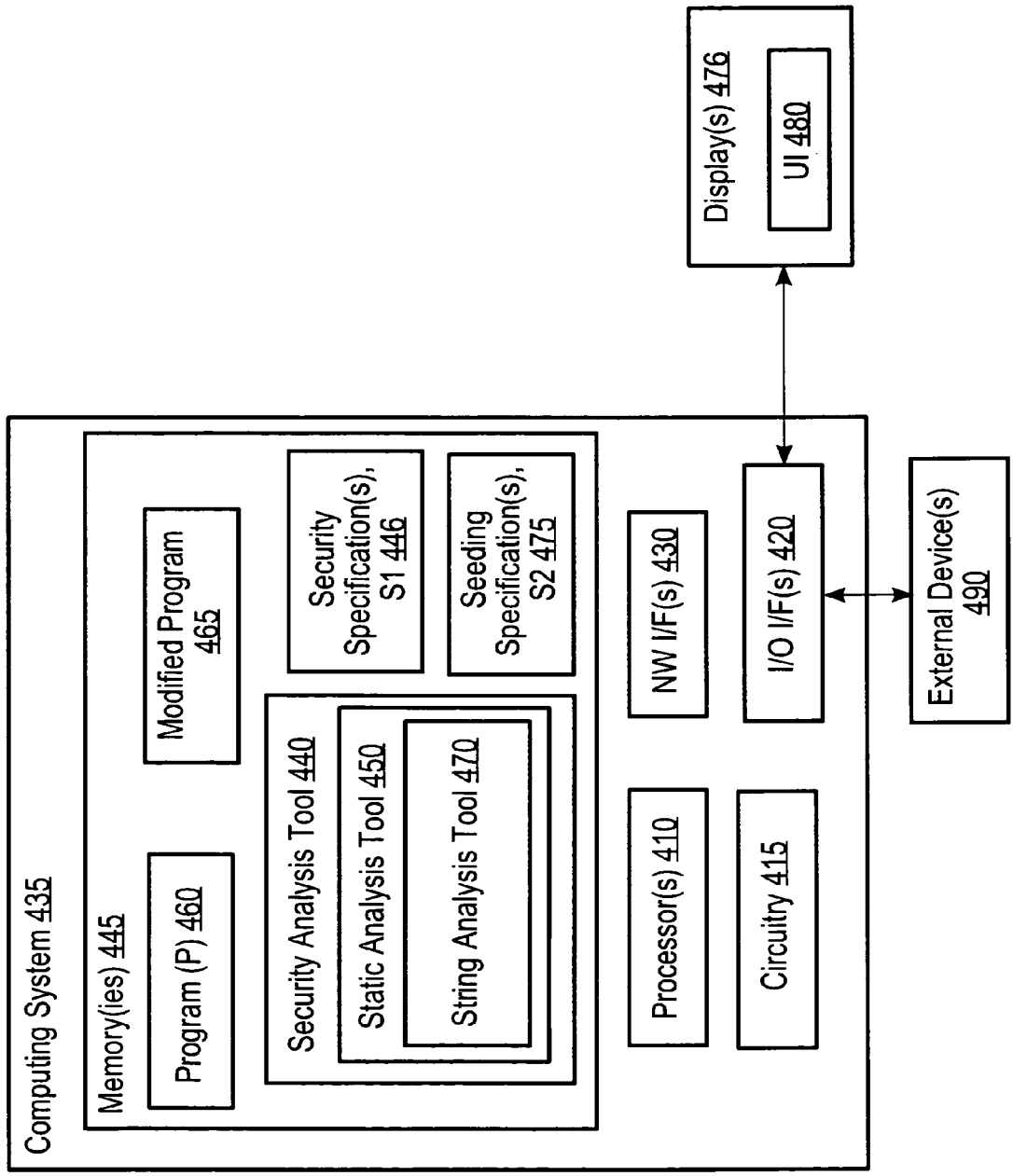
FIG. 4 is an example of a system suitable for performing the exemplary embodiments herein.

Referring to FIG. 4, this figure is an overview of a computing system 435 suitable for use with exemplary embodiments herein. The computing system 435 comprises one or more memories 445, one or more processors 410, one or more I/O interfaces 420, and one or more wired or wireless network interfaces 430. Alternatively or in addition to the one or more processors 410, the computing system 435 may comprise circuitry 415. The computing system 435 is coupled to or includes one or more displays 476 and one or more external device(s) 490. This example provides a program (P) 460, a modified program 465, one or more security specifications 446, and one or more seeding specifications 475 in the one or more memories 460. The one or more memories 445 also include a security analysis tool 440 as, in an exemplary embodiment, computer-readable program code that is executable by the one or more processors 410 to cause the computing system 435 to perform one or more of the operations described herein. In another example, the operations may also be performed, in part or completely, by circuitry 415 that implements logic to carry out the operations. The circuitry 415 may be implemented as part of the one or more processors 410 or may be separate from the one or more processors 410. The processors 410 may be any processing unit, such as a digital signal processor and/or single-core or multi-core general purpose processors. The circuitry 415 may be any electronic circuit such as an application specific integrated circuit or programmable logic. The memories 445 may comprise non-volatile and/or volatile RAM, cache memory, NAND-based flash memory, long term storage (e.g., hard drive), and/or read only memory. The one or more I/O interfaces 420 may include interfaces through which a user may interact with the computing system 435. The display(s) 476 may be a touchscreen, flatscreen, monitor, television, projector, as examples.

A user interacts with the security analysis tool 440 through the UI 480 in an exemplary embodiment or through the network interface(s) 430 in another non-limiting embodiment. The external device(s) 490 enable a user to interact in one exemplary embodiment with the computing system 435 and may include a mouse, trackball, keyboard, and the like. The network interfaces 430 may be wired or wireless and may implement a number of protocols, such as cellular or local area network protocols. The elements in computing system 435 may be interconnected through any technology, such as buses, traces on aboard, interconnects on semiconductors, and the like.

In this example, the security analysis tool 440 includes a static analysis tool 450 that further includes a string analysis tool 470. The static analysis tool 450 performs an analysis of computer software in the program 460 that is performed without actually executing the program 460, as described above. In most cases, the analysis is performed on some version of the source code for the program 460, although object or even executable code may be used. The string analysis tool 470 performs string analysis, e.g., including operations performed in blocks 320, 325, 330, 340, and 345 of FIG. 2. The security analysis tool 440 operates on the program 460 and may create a modified program 465. For instance, if based on the analysis of the string analysis tool 470 and the static analysis tool 440, a sink is reached by a flow of taint from a source to the sink without a proper endorsement by a sanitizer, the security analysis tool 470 (e.g., or static analysis tool 440) could insert, in the flow and prior to the sink, a call to a sanitizer. The insertion may be used to create a modified program 465. As another example, the string analysis tool 470 (e.g., or the static analysis tool 450 or the security analysis tool 440) could instead of inserting a call to a sanitizer, indicate to a user via, e.g., the UI 480 that there is a vulnerability starting at the source and ending at the sink and, e.g., based on one or more strings. In this example, the program 460 may not be modified into program 465. Furthermore, modifications may be made directly to program am 460, such that there is only one program (that is, there is a single program instead of program 460 and modified program 465).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular for ins "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Acronyms that appear in the text or drawings are defined as follows.
HTML hypertext markup language
IFDS interprocedural, finite, distributive, subset
I/F interface
UI user interface
URL uniform resource locator

What is claimed is:

1. A computer-implemented method, comprising:
accessing one or more seeding specifications and a program comprising computer-readable code;
applying the one or more seeding specifications to the program to identify for analysis seeds comprising strings for corresponding identified string variables; and
tracking flows emanating from the identified seeds and performing at least the following for the tracking:
computing an integral offset into a tracked string variable for any statements causing such a computation;
providing a string representation based on the computed integral offset, wherein the provided string representation comprises a value of the integral offset and an indication of the corresponding tracked string variable; and
modeling string manipulations of the tracked string variables using the string representations, wherein tracking further comprises for string manipulations other than statement performing an index-sensitive string manipulation and statements causing computation of an integral offset into a tracked string variable, applying an operation to the string representation while preserving the integral offset.

2. The method of claim 1, wherein providing a string representation comprises, for a statement computing an integral offset into a string of a tracked string variable, encoding the offset directly as part of the string representation.

3. The method of claim 1, wherein modeling further comprises, for a statement performing an index-sensitive string manipulation, utilizing the integral offset to model the manipulation.

4. The method of claim 1, further comprising determining whether tracked string variables potentially cause security violations.

5. The method of claim 1, further comprising performing accessibility analysis using the tracked string variables.

6. The method of claim 1, wherein further comprising performing typestate analysis using the tracked string variables.

\* \* \* \* \*